United States Patent [19]

Knoblauch et al.

[11] Patent Number: 5,489,402
[45] Date of Patent: Feb. 6, 1996

[54] METHOD FOR REGULATIING THE INDIVIDUAL LAYER THICKNESSES OF A COEXTRUDED MULTILAYER PLASTIC WEB

[75] Inventors: Klaus-Dieter Knoblauch, Bad Nenndorf; Gerd Barthelemy, Troisdorf, both of Germany

[73] Assignee: Fenhauser GmbH & Co. Maschinenfabrik, Troisdorf, Germany

[21] Appl. No.: 256,998

[22] PCT Filed: Feb. 9, 1993

[86] PCT No.: PCT/EP93/00301

§ 371 Date: Jul. 23, 1994

§ 102(e) Date: Jul. 23, 1994

[87] PCT Pub. No.: WO93/15897

PCT Pub. Date: Aug. 19, 1993

[30] Foreign Application Priority Data

Feb. 10, 1992 [DE] Germany ................. 42 03 755.7

[51] Int. Cl.[6] .................................. B29C 47/92
[52] U.S. Cl. ................. 264/407; 73/620; 73/627; 73/632; 264/171.11; 264/211.23; 264/445; 425/133.5; 425/141; 425/174.2
[58] Field of Search .................. 73/618–621, 627–629, 73/644, 624, 632; 264/40.1, 40.2, 23, 171, 211.23; 425/141, 174.2, 133.5; 310/336

[56] References Cited

U.S. PATENT DOCUMENTS

| 4,505,160 | 3/1985 | Zacharias, Jr. | 310/336 |
|---|---|---|---|
| 4,551,289 | 11/1985 | Schwab et al. | 264/40.2 |
| 4,587,849 | 5/1986 | Gross | 73/644 |
| 4,676,936 | 6/1987 | Wallace et al. | 264/40.2 |
| 4,740,146 | 4/1988 | Angelbeck | 425/174.2 |
| 5,038,615 | 8/1991 | Trulson et al. | 73/620 |
| 5,062,299 | 11/1991 | Davis et al. | 73/609 |
| 5,066,435 | 11/1991 | Lorenz et al. | 425/141 |

FOREIGN PATENT DOCUMENTS

| 418681 | 9/1990 | European Pat. Off. | |
| 3740088 | 11/1987 | Germany | |
| 3741793 | 7/1989 | Germany | |
| 3936496 | 11/1989 | Germany | |
| 783378 | 12/1980 | U.S.S.R. | 264/23 |
| 1527576 | 12/1989 | U.S.S.R. | 73/620 |

OTHER PUBLICATIONS

Plastverarbetter, 43(8), Aug. 1992, pp. 37–43.
Kunststoffe 77. Jahrgang 1987.9 "Automatische Ultraschall-Wanddickenmessung bei der Rohrextrusion" by J. Orzechowski, Bad Oeynhausen.

*Primary Examiner*—Mathieu D. Vargot
*Attorney, Agent, or Firm*—Antonelli, Terry, Stout & Kraus

[57] ABSTRACT

A method for regulating the thickness of several individual layers of an extruded multilayered plastic web involves melting at least two currents of molten plastic in different extruders and bringing the individual molten currents together in an adapter wherein the currents are superimposed into a laminated extruded multilayer stream. The extruded multilayer stream is supplied to a die slot. Devices are provided for controlling the flow of individual currents of molten plastic by modifying their sections before the currents are brought together in the adapter. In order to regulate the thickness distribution, the thickness of the individual layers of the multilayered extruded stream, which correspond to the different currents of molten plastics, is determined before the stream leave the die slot; that is, while the currents are still in a plastic state.

11 Claims, 3 Drawing Sheets

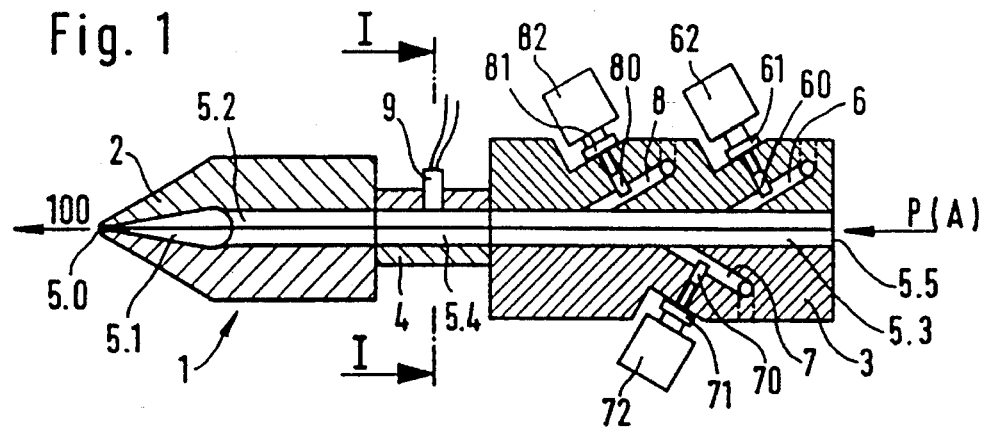
Fig. 1
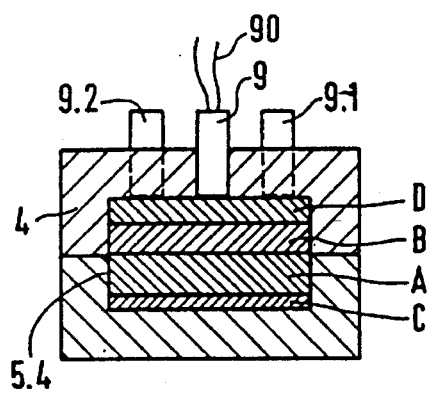
Fig. 2 (I-I)
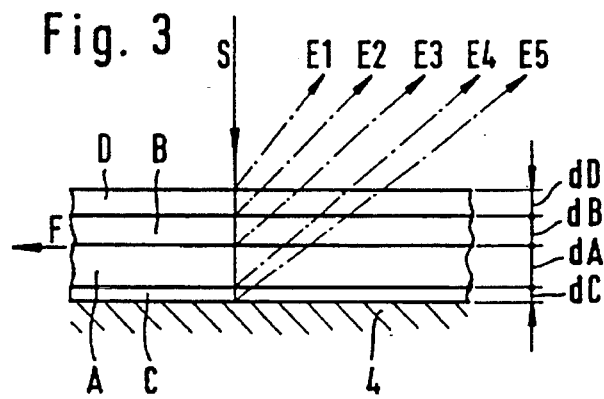
Fig. 3
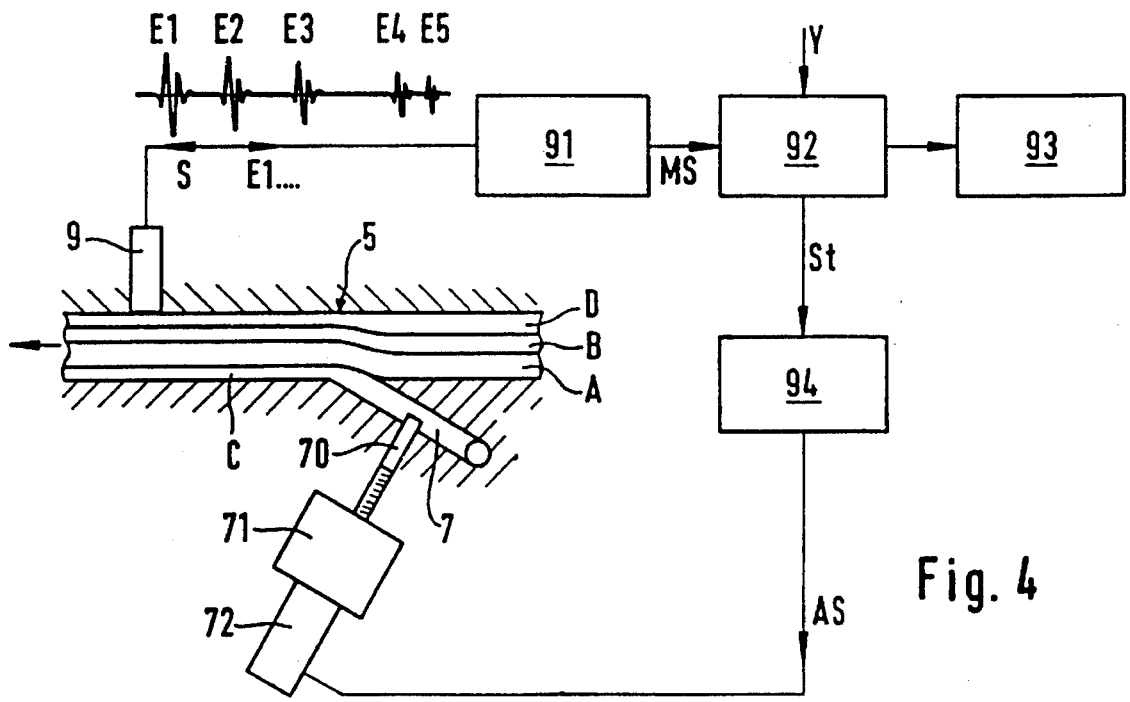
Fig. 4

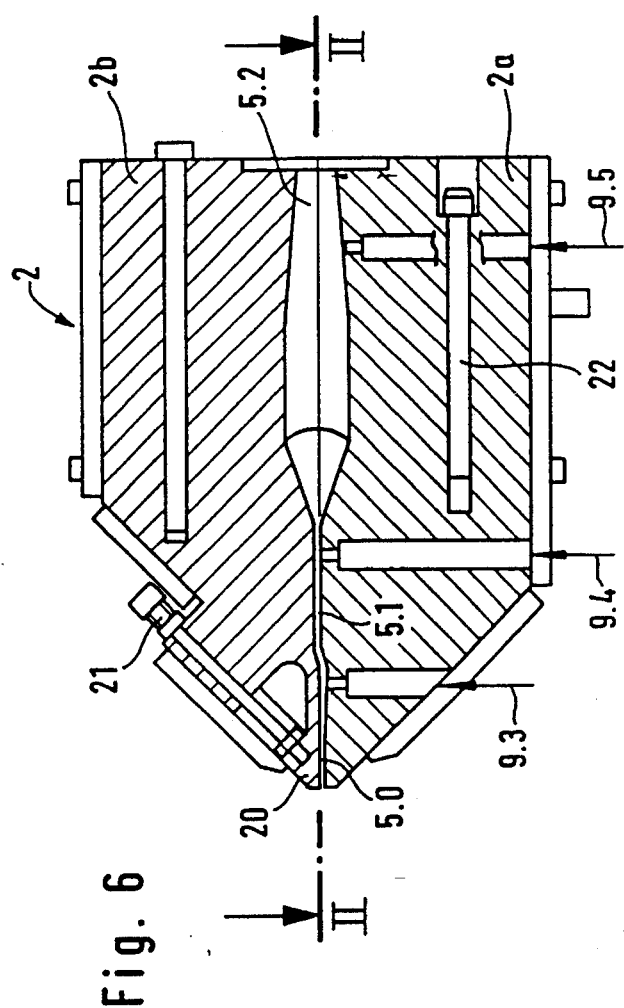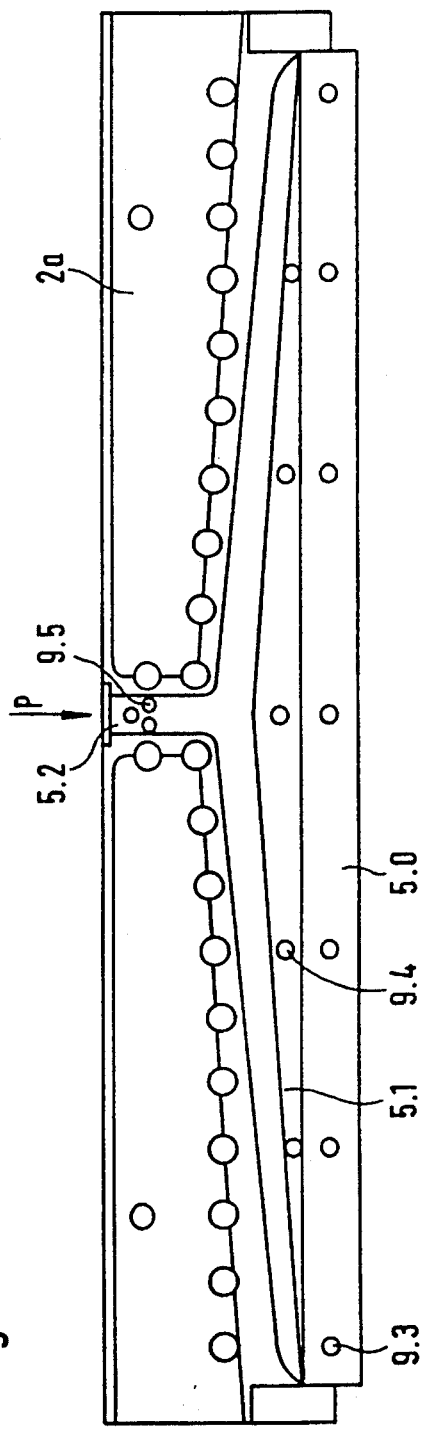

METHOD FOR REGULATIING THE INDIVIDUAL LAYER THICKNESSES OF A COEXTRUDED MULTILAYER PLASTIC WEB

FIELD OF INVENTION

The invention relates to a method for regulating the individual layer thicknesses of several layers of a multilayer plastic web produced by coextrusion, with at least two currents of molten plastic being melted separately in one of the different extruders and with the individual molten currents being brought together in an adapter and superimposed on one another layerwise to form a hank, and by the multilayer hank thus formed being fed to a slot die for shaping the multilayer plastic web, and with means being provided to control the flow of the individual molten currents prior to their being brought together in the adapter by changing the flow cross sections in order to influence both the thickness distribution of the layer formed by each molten current and laid down on the hank when they are brought together, and the flowrate.

BACKGROUND OF THE INVENTION

Multilayer plastic webs, including both films and slabs, can be manufactured by various multilayer extrusion methods. In extrusion coating, the various layers are superimposed outside the tool. In coextrusion, the method differs by bringing together the individual molten currents within the slot die and bringing together the individual molten currents before they reach the slot die, using an adapter. Coextrusion tools for making flat films for the packaging industry are described in greater detail for example in the journal *Kunstoffe*, Volume 74, No. 5, Pages 393–397, 1988.

In manufacturing multilayer plastic webs, the problem arising of achieving uniform thickness distribution and layer thickness of the individual molten currents and layers. Usually thickness measurements are conducted on the extruded multilayer plastic web after it has already left the slot die, in order to use the measured values obtained to trigger a change in throughput of raw material, in other words tire volumes of the molten currents. In addition, there is also the opportunity to use such measurement data to modify the extraction rate of flat films or plates from the slot die; see in this connection DE-OS 31 07 701 for example. One possibility for adjusting the flow cross sections of the molten currents coextruded into a main current for a multilayer plastic web in the area of guidance to the adapter is known for example from German Patent 37 41 793.

Another method for regulating the film thickness of flat films manufactured by extrusion likewise utilizes thickness measurement of the flat film, extruded from a slot die or coated thereby, over its width, in order to use the measurement data obtained additionally to heat the slot die in the appropriate areas or additionally to cool it in order to effect a corresponding change in the thickness distribution, i.e. of the molten current; see for example DE-OS 30 06 566.

To the extent that thickness measurement values are used for regulating the layer thicknesses of coextruded multilayer plastic webs as well as single-layer plastic webs, the thicknesses obtained after emerging from the slot die are measured in each case. Particularly in the case of multilayer plastic webs, it is difficult to control the molten currents sufficiently accurately in order to even in multilayer plastic webs being drawn out into very thin packaging films, with the individual layer thicknesses being reduced to 2μ in a Chill-roll method located downstream of the slot die. Hence, the goal of the invention is to provide an improved opportunity to regulate the individual layer thicknesses of coextruded multilayer plastic webs, in order to insure uniform thickness distribution even in multilayer plastic webs in which individual layers have relatively limited thicknesses, and especially to avoid gaps resulting from cracks in the layers.

SUMMARY OF THE INVENTION

According to the invention this goal is achieved for a method according to the species by virtue of the fact that the layer thicknesses of the individual layers, corresponding to the various molten currents, of the multilayer hank which is still in the plastic state before it emerges from the slot die and the measurement data obtained are evaluated and digitized, and the measurement signals thus obtained are compared with similarly digitized predetermined set values of the thicknesses of the individual layers, and in the event of deviations in the comparison between set and actual values, the result is used to change, i.e. regulate the flow cross sections for the individual molten currents immediately before the molten currents are brought together into a hank. The method according to the invention therefore uses for the first time measurement data that are obtained the layer thicknesses of the individual coextruded layers prior to emerging from the slot die, i.e. before leaving the slot nozzle, while the material of the individual layers is still molten. The invention is based on the fact that the closer the measurement point for sensing the individual layer thicknesses is located after the point where the individual molten currents combine to form a multilayer hank, the more rapidly a subsequent regulation or affecting of the flow conditions, both with respect to the change in flow cross sections and in conjunction with the change in throughput volumes for the individual layers involved can be performed in a deliberate and definitive manner. Previously, only temperature measurements from molten currents within the slot die nozzle tool, especially in the nozzle lip area, were conducted to obtain measurement data, but the distribution of the individual molten currents to the various layers and the layer thicknesses still prevailing in the tool remained unconsidered.

The method according to the invention for determining the layer thicknesses of the layers formed by the various molten currents and brought together in a hank is preferably conducted by means of ultrasound pulses, using the pulse echo principle, from the differences in travel time of the echo pulses.

Ultrasound measurement systems for measuring distance or thickness are basically known, and we will merely mention for the sake of example DE-OS 36 39 228, DE-OS 34 29 764, and EP-OS 01 46 829.

In addition, for the method according to the invention, the ultrasound echo pulses reflected from the individual layers are received by an ultrasound probe containing a transmitter and receiver, and converted into electrical signals. In this manner, the position and shape of the layers, i.e. their thicknesses, can be investigated and determined without direct mechanical contact, with the amplitude and travel time distances of the reflected echo signals providing information about the distance of the object, i.e. of the layers, from the ultrasound probe. It is also possible, in order to obtain the layer thicknesses, not only to determine the differences in travel time of the subsequently reflected echo pulses from an emitted ultrasound pulse, possibly also the amplitude or even the length of the halfwaves of the reflected echo pulses, and to use them in the evaluation.

Advantageous embodiments and improvements on the method according to the invention are provided in the characterizing features of the subclaims.

Advantageously the measuring devices in the form of ultrasound probes are brought directly into contact with the surface of the outermost layer of the multilayer stream to be measured, so that in particular they fit flush with the wall of the flow channel for the stream in the adapter or slot die. The measurement points can also be located on opposite sides of the flow channel, i.e. for a very thick stream. The layer thicknesses of the layers of the multilayer stream can be determined immediately after joining, with the last of the layers still inside the adapter area prior to emergence of the stream into the slot die, or directly after entering the slot die, or even in the area of the feed zone to the slot die, possibly shortly before Merging from the slot die of the nozzle lip zone. The regulating method according to the invention, involving evaluation of the layer thickness measurement in the tool or adapter, can also be combined with other measurement data obtained through other measurement parameters such as the temperature profile, etc., for regulating layer thickness extrusion and the flow behavior of the individual molten currents.

BRIEF DESCRIPTION OF THE DRAWINGS

The invention will now be described using the drawing as an example.

FIG. 1 is a schematic diagram of a coextrusion tool for multilayer plastic webs in a lengthwise section.

FIG. 2 shows section I/I in FIG. 1 in the connecting adapter area.

FIG. 3 is a schematic diagram of the ultrasound pulse echo pulses for the layers in FIG. 2.

FIG. 4 is the regulating circuit for layer thickness regulation of the coextruded plastic web.

FIG. 6 is a lengthwise section through a slot die with ultrasound probes.

FIG. 7 is a top view of the nozzle channel according to Section II/II in FIG. 6.

DETAILED DESCRIPTION OF THE INVENTION

Figure 5:
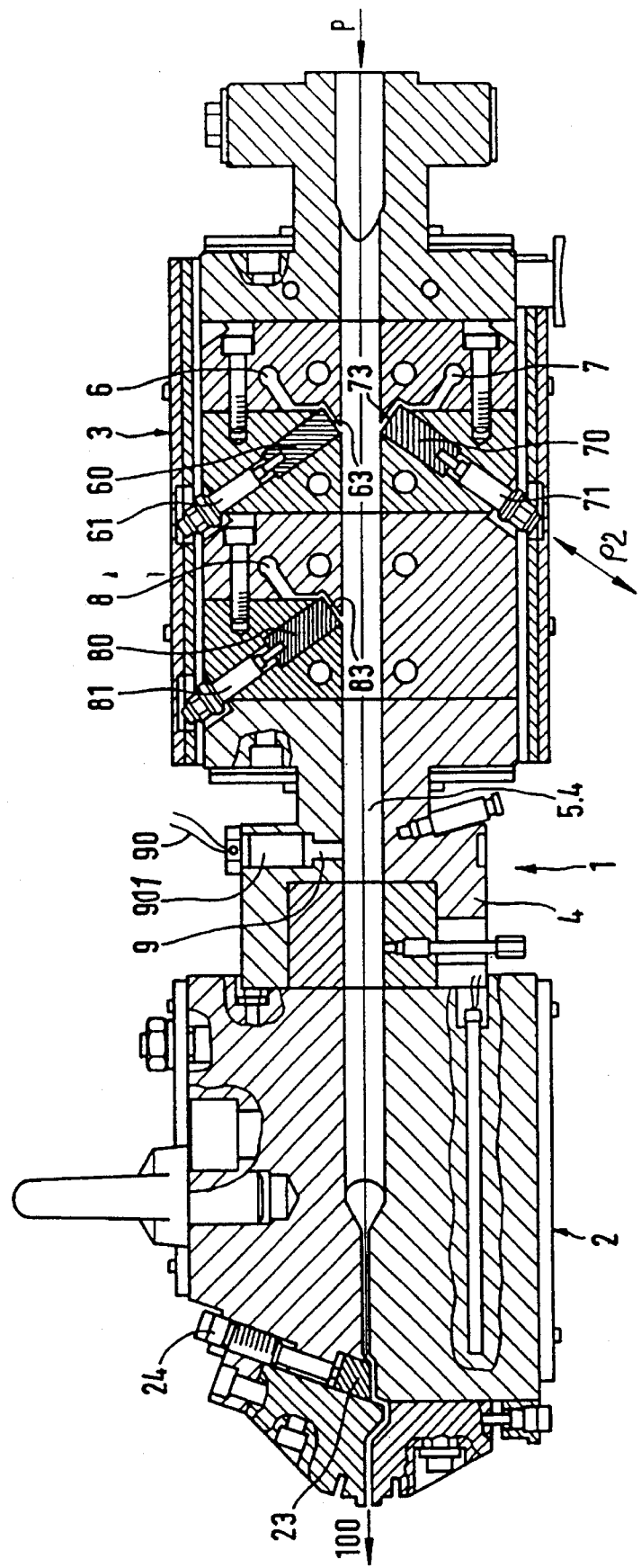
FIG. 5 is a lengthwise section through a complete coextrusion tool analogous to FIG. 1.

FIG. 1 is a schematic view of a coextrusion tool 1 with a slot die 2, coextrusion adapter 3 for 4 molten currents, and connecting adapter 4 between slot die and coextrusion adapter. The main molten current A is fed in the direction of arrow P from an extruder, not shown, through connecting channel 5.5 to the coextrusion adapter. The main flow channel running in arrow direction P through coextrusion tool 1 is divided into several areas, firstly the connecting channel 5.3 in adapter 3, in which the side channels are located that combine molten currents A,B,C,D layerwise on top of one another to form a hank. Then the coated molten hank enters distribution channel 5.2 of the slot die. Through feed zone 5.1 and the nozzle lip area 5.0, the melt, now shaped into a broad multilayer plastic web 100, leaves the slot die in order to be fed for example to a casting roll to manufacture thin films. Side channels 6, 7, 8, also called coextrusion channels, are provided in the area where the molten currents encounter the molten current that is in flow channel 5.3, with adjustable slide elements 60, 70, 80 similar to dam gates. By adjusting the sliding elements, the flow cross sections can be varied. The adjustable sliding elements are adjusted by means of positioning elements 61, 71, 81, adjusting screws for example, which are adjustable for example by means of electrical drives 62, 72, 83. To regulate the layer thicknesses in the multilayer plastic web 100 that has been produced and is leaving slot die 2, specifically each of the individual layers combined in this web to form a single web, the determination of the layer thicknesses of the molten currents coated to form a multilayer stream within coextrusion tool i is performed for example in the area prior to entry into the slot die, i.e. in the vicinity of connecting adapter 4 or in the area of coextrusion adapter 3. Measuring devices, for example in the form of one or more ultrasound probes 9 distributed over the width of the stream, are arranged in such fashion that the ultrasound transmitter comes directly in contact with the surface of the multilayer stream which is flowing through flow channel 5.3, 5.4. The measurement probes can be brought up to the channel from both sides in order to perform the measurements from different sides.

FIG. 2 shows schematically a view of the arrangement of ultrasound probes 9 and other ultrasound probes 9.1, 9.2, with the molten stream consisting of superimposed layers D, B, A, C. By means of ultrasound probe 9 the thickness of each of the individual layers A, B, C, and D, can be determined, as well as the thickness profile transverse to the flow direction and, by using the measurement data thus obtained for comparing the set and actual values, the necessary changes in the flow conditions for the individual molten currents in adapter 3 can be changed, for example in flow channels 6, 7, 8 and 5.5 in order to achieve the desired thickness profile for each of the layers of plastic web 100.

As shown schematically in FIG. 3, ultrasound probe 9 operates in such fashion that it acts simultaneously as a transmitter and receiver, and the emitted ultrasound pulse S is reflected at each of the layers D, B, A, and C and at the wall of the flow channel, here connecting adapter 4, so that echo pulses E1, E2, E3, E4 and E5 that return successively with different amplitudes and frequencies are obtained. Depending on the different travel times of echo pulses E1 to E5, and possibly the additional evaluation of their amplitudes and/or halfwave lengths, it is possible to determine the individual thicknesses dB, dD, dA, and dC of the individual layers B, D, A, and C in flow channel 5.4.

In FIG. 4, the regulating circuit shows how echo signals S1 to S5 obtained with ultrasound probe 9 are evaluated and digitized in a signal processing unit to form a measurement signal MS fed to a computer 92. In this computer the predetermined set values for the individual layer thicknesses V are entered and the required changes in the flow cross sections, i.e. those of the individual molten currents A to D, are calculated. Influencing the individual molten currents to regulate the layer thicknesses that can be achieved occurs firstly by adjusting the flow cross sections with the aid of the slides for flow channels 6, 7, and 8 and secondly by regulating the throughput volumes at the individual extruders for the individual molten currents. Accordingly, a signal is sent from computer 92 to the throughput calculator for the raw material supply to the individual extruders 93, and another adjusting signal ST is sent to adjusting device 93 for slide elements 60, 70, 80 for the individual coextruders. The working signal AS thus obtained is then used as a control signal for drive elements 62, 72, 82 of the slide elements associated with the individual coextrusion channels.

FIG. 5 shows a coextrusion tool 1 including structural details in lengthwise section which corresponds to the theoretical design according to FIG. 1. The incorporation of ultrasound probe 9 in the adapter area of connecting adapter 4 in connecting channel 5.4 for determining the individual layer thicknesses of the coextruded layers brought together to form a hank is evident. Ultrasound probe 9 is surrounded in the further area by a sleeve 901, and terminals 90 are likewise indicated that lead to a signal processing device and the ultrasound pulse transmitter. Coextrusion adapter 3, which comprises three coextrusion channels 6, 7, 8 for three layers applied to main molten current A, is shown with its adjustable elements 60, 70, 80. The adjusting elements designed as adjusting screws 61, 71, 81 are shown which are adjusted by a regulated drive, not shown; see FIG. 4. By adjusting slide elements 70, 80, 60 in the direction of arrow P2, for example in the case of slide 70, the flow cross sections 73 and 63, 83 of the individual coextrusion channels are changed, corresponding to the desired layer thicknesses B, C, D, and A. The slot die tool is equipped with a dam gate 23 adjustable by means of compression screw 24. Measurement probes 9 for determining the layer thicknesses of the individual layers of the molten hank can be located not only in the vicinity of coextrusion adapter 3 or connecting adapter 4 but also in the area of slot die 2.

In FIG. 6, ultrasound probes 9.3 are provided for example in the vicinity of the distribution channel of the slot die, while ultrasound probe 9.4 is located in the area of the feed zone and ultrasound probe 9.3 is located in the nozzle lip area.

In FIG. 7, view II/II in FIG. 6 is shown, i.e. looking down on lower part 2a of the opened slot die in a reduced representation. Here the arrangement of ultrasound probes 9.3, 9.4, 9.5 in various areas of the flow cross section of the slot die is also indicated, while in one area, for example in the feed zone, a plurality of ultrasound probes 9.4 is provided, distributed over the cross section. To regulate the layer thicknesses, at least one measurement is necessary, i.e. in the distribution channel, in the feed zone, or in nozzle lip area 5.0. The slot die according to FIG. 6 consists of upper part 2b and lower part 2a and has a flexible lip 20 adjustable by means of compression screw 21 in the vicinity of the nozzle outlet.

We claim:

1. A method for regulating the individual thickness of several layers of a multilayer plastic web produced by coextrusion wherein at least two molten plastic currents are melted separately in one or different extruders and the individual molten currents are brought together in an adapter and superimposed on one another layerwise to form a multilayer stream, the multilayer stream thus formed is fed to a slot die to form the multilayer plastic web, and the flow of the individual molten currents is controlled immediately before the merger of the molten currents in the adapter by changing the flow cross sections of the currents in order to influence both the thickness distribution of a layer formed by each molten current and laid on the multilayer stream when the currents are brought together, as well as the flow rate, which comprises measuring layer thicknesses of individual layers of the multilayer stream corresponding to the various molten currents before the multilayer stream emerges from the slot die; evaluating and digitizing resultant measurement data to provide measurement signals; comparing values of the measurement signals with digitized predetermined set values for thicknesses of the individual layers; and, in the event of deviations in the comparison of the set values versus the actual measured values of the thicknesses of the layers, the resulting deviations are used to change the flow cross sections of the individual molten currents immediately before the molten currents are brought together in the adapter to form the multilayer stream.

2. A method according to claim 1 wherein measuring of the thicknesses of the layers formed by the various molten currents and brought together to form a multilayer stream in which one layer is placed on top of another layer, is effected by directing ultrasonic pulses into the stream to provide the echo pulses during passage through said stream, differences in travel time of the echo pulses providing said measurement signals.

3. A method according to claim 2 wherein amplitude or frequency differences between the echo pulses received are also evaluated in providing said measurement signals.

4. A method according to claim 1 wherein in order to measure the layer thicknesses of the individual layers, ultrasound probes for emitting ultrasound pulses and receiving the echo pulses reflected from the individual layers are positioned in the adapter or slot die next to the multilayer stream.

5. A method according to claim 4 wherein the ultrasound probes are brought directly into contact with the surface of an outermost layer of the stream to be measured, and are made flush with a wall of a flow channel for the multilayer stream in the adapter or slot die.

6. A method according to claim 4 wherein a thickness profile is determined transverse to the flow direction for each layer in the stream by positioning the probes at a plurality of measurement points distributed across the width of the stream.

7. A method according to claim 1 wherein the thicknesses of the individual layers of the multilayer stream are measured immediately after combination with the last of the currents, but still inside the adapter, before the stream enters the slot die.

8. A method according to claim 1 wherein the thicknesses of the individual layers of the multilayer stream are determined immediately before entry of the stream into the slot die.

9. A method according to claim 1 wherein the thicknesses of the individual layers of the multilayer stream are determined in an area of the feed zone of the slot die.

10. A method according to claim 1 wherein the thicknesses of the individual layers of the multilayer stream are determined in an area of a nozzle lip zone of the slot die.

11. A method according to claim 2 wherein an ultrasound probe equipped with a control device for controlling the ultrasound pulses to be emitted and with a signal processing unit for detecting and evaluating the echo pulses reflected by the stream is provided to effect said regulation and wherein the emitted ultrasound pulses impact at least two reflecting surfaces located at different distances from a transmission point, and the signal processing unit is capable, for an emitted ultrasound pulse, of comparing the magnitudes of at least two corresponding echo pulses which come from the reflecting surfaces at different distances from the transmission point and, depending on the comparison, generating a measurement signal which is a measure of the thickness of the respective layer in the stream, and the measurement signal thus obtained is compared in digitized form with digitized predetermined set values in a computer, and in the event of deviations in the set and actual values, the result is used to change the flow cross sections in partial areas or entire areas of the molten currents in the adapter and to change throughput of the individual extruders for the molten currents of the individual layers.

\* \* \* \* \*